May 21, 1968 R. F. ROHDE 3,384,556

METHOD OF ELECTROLYTICALLY DETECTING IMPERFECTIONS IN OXIDE PASSIVATION LAYERS

Filed Nov. 23, 1964

INVENTOR.
ROBERT F. ROHDE

BY

Joseph A. Spaldrich

AGENT

United States Patent Office 3,384,556
Patented May 21, 1968

3,384,556

METHOD OF ELECTROLYTICALLY DETECTING IMPERFECTIONS IN OXIDE PASSIVATION LAYERS

Robert F. Rohde, Minneapolis, Minn., assignor to Sperry Rand Corporation, New York, N.Y., a corporation of Delaware Filed Nov. 23, 1964, Ser. No. 413,167
17 Claims. (Cl. 204—1)

Figure 1:
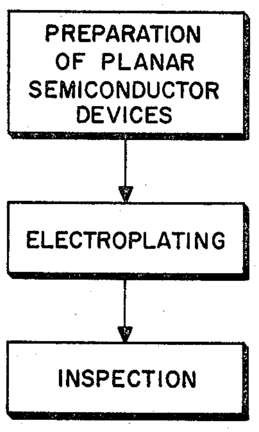

This invention is directed to a method for detecting holes, flaws, and other imperfections in oxide passivation layers of integrated silicon circuits and other planar semiconductor devices. The aforementioned imperfections can cause electrical short circuits between the ohmic circuit patterns deposited on the passivation and the silicon substrate as well as to the active or passive components of the integrated circuit element.

Many observed failures of integrated silicon circuits and other planar semiconductor devices have been attributed to flaws or holes in the oxide passivation layers, such holes or flaws in the passivation layers resulting primarily from a lack of integrity of the photoresist. Accordingly, when such flaws occur beneath any portion of the deposited ohmic circuit patterns they can cause short circuits to associated active or passive components as well as to the substrate. The term substrate as used herein is intended to be the starting material into which the active or passive components are diffused as opposed to the metal or ceramic headers upon which these units are commonly mounted.

The flaws may be seen with a high powered microscope, but it is not possible by such means to determine whether the flaws actually penetrate the passivation. The method of the instant invention renders it possible to determine which of the many flaws usually observable in the passivation layers of integrated silicon circuits and other planar semiconductor devices penetrate the layer and are therefore responsible for failure or are potentially dangerous. Prior to the use of the instant invention it was merely possible to observe microscopically the existence of holes or flaws in the passivation and then to speculate as to whether such flaws were responsible for the electrical failure.

Where failure has occurred in such integrated circuits due to shorts from the ohmic pattern to the substrate or to any passive or active components grown into the substrate, the method of the instant invention makes it possible to pinpoint the precise area of failure. The method can be very useful as a screening device in the integrated circuits manufacturing processes. Here entire wafers can be evaluated for hole and flaw density before the deposition of ohmic patterns thereby increasing the yield of reliable devices.

The primary object of the present invention is to provide a method of detecting and locating imperfections in passivation layers of integrated silicon circuits or other planar devices.

An additional primary object of the present invention is to provide a nondestructive testing method for determining imperfections in passivation layers of integrated silicon circuits or other planar semiconductor devices.

Further object of the present invention is to provide a method of detecting and locating potential short circuit paths through passivation layers of integrated silicon circuits or other planar semiconductor devices prior to deposition of ohmic circuit patterns.

These and other more detailed and specific objects will be disclosed in the course of the following specification reference being had to the accompanying drawing in which:

FIGURE 1 provides a block diagram of the primary steps for practicing the method of the invention.

Figure 2:
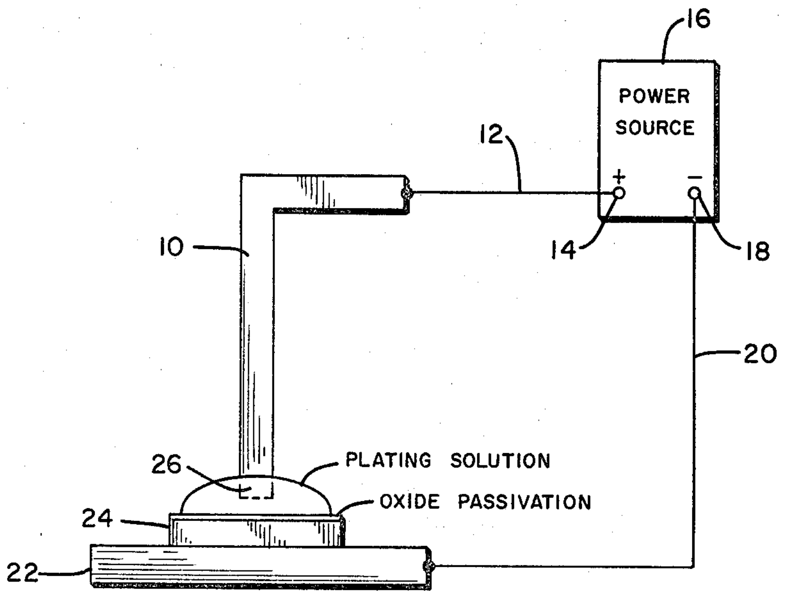

FIGURE 2 illustrates a plating system, a schematic illustration.

Inasmuch as integrated silicon circuits or other planar semiconductor devices are formed by the planar-diffusion method and/or epitaxial methods both well-known in the art, such methods not being the objects of the present invention, no further discussion of the manufacturing processes involved is deemed necessary.

The method of the instant invention is carried out in accordance with the objects of the invention in the following manner:

The first step of the method of the instant invention is to etch or remove the ohmic circuit patterns and terminal bonds by the application of a suitable chemical reagent to the surface of the crystal or integrated circuit element. However, it is evident that the step of removing the ohmic circuit patterns is eliminated when the present method is used prior to deposition or formation of the ohmic circuit patterns such as in the case of quality control screening operations during the manufacturing process.

Next, the passivated crystal surface less the etched away ohmic circuit patterns is rinsed with suitable solvents to provide a chemically clean surface. Then the passivated crystal surface is blown dry with air or dried in another suitable manner. By way of reference to the schematic illustration in FIGURE 2, there is shown a plating system including a micromanipulator probe or anode means 10 connected to a conductor means 12 in turn connected to the positive terminal 14 of a power source 16. Conductor means 20 is connected to the negative terminal 18 of the power source and to a conductive element or header means 22. The substrate of the integrated circuit element 24 is positioned on the header means. End 26 of the anode probe means 10 is disposed directly above the passivation surface of the circuit element and spaced a predetermined distance from the surface. Copper cyanide plating solution, for example, is added to the surface in the amount just sufficient to only just cover the entire surface in contact with the anode; however, the plating solution is not permitted to flow over the edge of the circuit element onto the header.

The eletrolytic plating solution flows into and along the flaws or imperfections, and upon the occurrence of such imperfections extending through the oxide passivation layers to the substrate and/or to active or passive components grown, in to the substrate, current will pass through the substrate to the header means 22. As is evident, therefore, the application of current through the circuit means including the power source, anode means, electrolytic plating solution, substrate, and the header means, produces electroplating to the substrate through the imperfections. Likewise, imperfections extending through the oxide passivation layers above active or passive components grown into the substrate will also be electroplated. The results are readily apparent through a microscope.

If the manufacturing process for forming the semiconductor device includes the epitaxial method, and the imperfections or holes through the oxide passivation to the epitaxial layer formed on the substrate, the same result occurs. Likewise, imperfections extending through the oxide passivation layers above active or passive components grown into the epitaxial layer will produce the same results when electroplated.

There is no intention to limit the plating system to copper. For example, nickel may be used with a suitable nickel electrolytic plating solution. A variety of plating solutions and anode material may be utilized; however, the electrolytic plating solution must contain salts of the anode means.

As the plating proceeds, progress of the electroplating may be observed under a microscope. Approximately 30 to 60 seconds may be sufficient for most subjects. The next step of the method includes a rinsing and drying as explained above. Finally, the specimen is inspected under a microscope. If a copper probe or anode in copper plating cyanide solution is utilized, copper will be found on the crystal surface wherever there was a current path through the passivation to the substrate or the active and passive components within the substrate or to the epitaxial layer and the components diffused therein in the case of the epitaxially formed semiconductor device. As observed, transistor emitters and collector windows and diode cathode windows will be plated with copper. The resistor windows will also be plated. Accordingly, unwanted holes in the passivation layers are made visible by the copper plating. Observation of the imperfections or holes that are detrimental to the operation of the integrated circuit element are evidenced by a mushroom like growth of copper on the surface, thus indicating and locating them precisely.

It is understood that suitable modifications may be made in the method as disclosed provided that such modifications come within the spirit and scope of the appended claims. Having now, therefore, fully illustrated and described my invention, what I claim to be new and desire to protect by Letters Patent is:

What is claimed is:

1. A nondestructive method of detecting and locating in a planar semiconductor device imperfections in oxide passivation layers grown onto said device in accordance with planar diffusion processes, said method comprising the steps of:

(a) removing from a first surface of said device the ohmic circuit pattern to expose said imperfections,
(b) cleaning said surface,
(c) disposing a second surface of said device, corresponding to a substrate surface, on a conductive header means,
(d) interconnecting a first end of an anode means to a positive terminal of a voltage source and disposing a second end of said anode means over said first surface oxide layers and at a predetermined distance therefrom,
(e) interconnecting said header means to a negative terminal of the voltage source,
(f) adding an electrolytic plating solution to the first surface in the amount to just cover the entire first surface and also contact the second end of the anode means, said plating solution extending entirely through the imperfections in the passivation layers to the substrate and also extending entirely through imperfections in the passivation layers to active and passive components grown into the substrate, whereby the application of current to the plating solution causes electroplating through said imperfections.

2. The method defined by claim 1 wherein the anode means is copper.

3. The method defined by claim 2 wherein the electrolytic plating solution is substantially copper cyanide and the anode means is copper.

4. The method defined by claim 2 wherein the electrolytic plating solution is substantially nickel sulfate and the anode means is nickel.

5. The method defined by claim 1 wherein the electrolytic plating solution contains in part salts of the anode means.

6. The method defined by claim 1 wherein the ohmic circuit pattern is removed by etching and the first surface is cleansed with a solvent.

7. A nondestructive method of detecting and locating in planar semiconductor devices imperfections in oxide passivation layers grown onto said devices in accordance with planar diffusion processes, the method comprising the steps of:

(a) removing the ohmic circuit pattern by etching, to expose the imperfections, (b) electrically interconnecting a substrate of said device with a conductive header means,
(c) electrically interconnecting said header means with a power source,
(d) interconnecting an anode means to the power source,
(e) and applying a current from the power source to an electrolytic plating solution covering only the entire surface passivation of the device and contacting the anode means, said plating solution extending through said imperfections to cause electroplating.

8. A method of detecting and locating pinholes occurring beneath ohmic circuit patterns deposited over surface oxide passivation layers grown on a planar semiconductor device, said pinholes extending through the oxide passivation layers to a substrate surface and to active and passive elements grown into the device, said method comprising the steps of:

(a) removing the ohmic circuit patterns by etching to expose the pinholes,
(b) and electroplating through said imperfections to provide an indication of an electrical circuit failure path.

9. A method of detecting and locating pinholes occurring beneath ohmic circuit patterns deposited over surface oxide passivation layers grown on a planar semiconductor device, said pinholes extending through the oxide passivation layers to a substrate surface and to active and passive elements grown into the device, said method comprising the steps of:

(a) electroplating through said pinholes to the substrate to provide an indication of a potential short circuit.

10. A method of detecting and locating pinholes within oxide passivation layers grown upon a substrate of a planar semiconductor device, the method comprising the steps of:

(a) preparing said device by cleansing,
(b) adding an electrolytic plating solution to only just cover said oxide passivation layers,
(c) electroplating through said imperfections to provide a visual indication of said pinholes.

11. A method of detecting and locating pinholes occurring beneath ohmic circuit patterns deposited over surface oxide passivation layers grown on a planar semiconductor device, said pinholes extending through the oxide passivation layers to a substrate surface and to active and passive elements grown into the device, said method comprising the steps of:

(a) removing the ohmic circuit patterns by etching to expose the pinholes,
(b) cleansing said surface to remove undesirable substances and then drying said surface,
(c) disposing said substrate upon an electrically conductive means,
(d) adding an electrolytic plating solution to said cleansed surface in the amount only to just cover the surface, said plating solution flowing through said pinholes,
(e) disposing an anode so as to contact the plating solution and interconnecting said anode with a positive terminal of a power source conditioned to a predetermined output value,
(f) interconnecting said electrically conductive means with a negative terminal of the power source,
(g) applying current from the power source through the anode, plating solution, and electrically conductive means whereby an electrolytic plating action is effected through the pinholes to provide visual indications of the imperfections.

12. The method of claim 11 wherein the surface is cleansed after electroplating.

13. The method of claim 12 wherein electroplating effected is observed under a microscope.

14. The method of claim 11 wherein the electrolytic plating solution is copper cyanide and the anode is copper.

15. The method of claim 11 wherein the electrolytic plating solution is substantially nickel sulfate and the anode is nickel.

16. The method of claim 11 wherein the electrolytic plating solution contains in part salts of the anode means.

17. A method of detecting within semiconductor devices pinholes which extend entirely through the oxide passivation layers grown upon a substrate, said devices being formed by epitaxial processes, said method comprising the steps of:

(a) electroplating said pinholes to provide a visual indication of the imperfections.

References Cited

UNITED STATES PATENTS

| | | | |
|---|---|---|---|
| 3,188,251 | 6/1965 | Straight et al. | 204—15 |
| 3,282,805 | 11/1966 | Brown | 204—1 |

JOHN H. MACK, *Primary Examiner.*

THOMAS M. TUFARIELLO, *Assistant Examiner.*